(12) United States Patent
Thubert et al.

(10) Patent No.: US 12,212,427 B2
(45) Date of Patent: *Jan. 28, 2025

(54) SYSTEMS AND METHODS FOR PREVENTING SOLICITED-NODE MULTICAST ADDRESS COLLISIONS

(71) Applicant: Cisco Technology, Inc., San Jose, CA (US)

(72) Inventors: Pascal Thubert, Roquefort-les-Pins (FR); Eric M. Levy-Abegnoli, Valbonne (FR); Patrick M. P. Wetterwald, Mouans Sartoux (FR); Ratko Kovacina, Ottawa (CA)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/452,917

(22) Filed: Aug. 21, 2023

(65) Prior Publication Data
US 2023/0396459 A1 Dec. 7, 2023

Related U.S. Application Data

(63) Continuation of application No. 17/457,823, filed on Dec. 6, 2021, now Pat. No. 11,743,067.

(51) Int. Cl.
*H04L 12/18* (2006.01)
*H04L 9/40* (2022.01)

(52) U.S. Cl.
CPC ...... *H04L 12/1886* (2013.01); *H04L 12/1881* (2013.01); *H04L 63/0227* (2013.01)

(58) Field of Classification Search
CPC ............ H04L 12/1886; H04L 12/1881; H04L 63/0227
See application file for complete search history.

(56) References Cited

U.S. PATENT DOCUMENTS

| 10,623,311 B2 | 4/2020 | Gobriel et al. |
| 2006/0002391 A1 | 1/2006 | Takihiro et al. |

(Continued)

FOREIGN PATENT DOCUMENTS

| GB | 2283645 A | 10/1995 |
| KR | 20110065975 A | 6/2011 |

OTHER PUBLICATIONS

PCT Notification of Transmittal of the International Search Report and the Written Opinion of the International Searching Authority, or the Declaration, re Intl. Application No. PCT/US2022/080959.

*Primary Examiner* — Mohamed A. Wasel
(74) *Attorney, Agent, or Firm* — Baker Botts L.L.P.

(57) ABSTRACT

A method includes receiving, at a first edge node, an Internet Protocol (IP) multicast address of a first silent host node. The method further includes receiving, at a second edge node, an IP multicast address of a second silent host node. The IP multicast address of the first silent host node is equal to the IP multicast address of the second silent host node. The method further includes storing the IP multicast address of the first and second silent host node in a shared entry of a routing table. The method further includes receiving, at a third edge node, a packet from a third host node and determining that a destination address of the packet corresponds to the IP multicast address stored in the shared entry of the routing table. The method further includes sending the packet to both the first host node and the second host node.

18 Claims, 7 Drawing Sheets

(56) References Cited

U.S. PATENT DOCUMENTS

| | | |
|---|---|---|
| 2009/0059924 A1 | 3/2009 | Muramoto et al. |
| 2009/0285215 A1 | 11/2009 | Kaippallimalil et al. |
| 2011/0085548 A1 | 4/2011 | Fernández Gutiérrez |
| 2014/0269717 A1 | 9/2014 | Thubert et al. |
| 2014/0325090 A1 | 10/2014 | Michelin et al. |
| 2014/0328343 A1 | 11/2014 | Kapadia et al. |
| 2015/0358226 A1 | 12/2015 | Liu |
| 2017/0063823 A1 | 3/2017 | Cheng et al. |
| 2017/0078241 A1 | 3/2017 | Zhang et al. |
| 2021/0092045 A1 | 3/2021 | Nagarajan et al. |
| 2021/0344591 A1 | 11/2021 | Kondalam et al. |
| 2021/0392571 A1 | 12/2021 | Kneckt et al. |
| 2022/0255864 A1 | 8/2022 | Wang et al. |
| 2022/0311705 A1 | 9/2022 | Thubert et al. |

SYSTEMS AND METHODS FOR PREVENTING SOLICITED-NODE MULTICAST ADDRESS COLLISIONS

PRIORITY

This nonprovisional application is a continuation under 35 U.S.C. § 120 of U.S. patent application Ser. No. 17/457,823 filed on Dec. 6, 2021, and entitled "SYSTEMS AND METHODS FOR PREVENTING SOLICITED-NODE MULTICAST ADDRESS COLLISIONS," all of which is hereby incorporated by reference in its entirety.

TECHNICAL FIELD

The present disclosure relates generally to techniques for preventing Solicited-Node multicast address (SNMA) collisions when discovering silent hosts in network fabrics.

BACKGROUND

Computer networks are generally groups of computers or other devices that are communicatively connected, and use common sets of communication protocols, over interconnections for the purposes of exchanging data and/or sharing resources. One of the principal communication protocols is the Internet Protocol (IP) that is used to create IP networks where computers are given unique IP addresses that allow for the computers to send and receive information with each other. However, as IP networks grow, they often experience issues such as network congestion, reduced network performance and speed, reduced network security, administrative burdens, and/or other issues. To help address these issues, IP networks are often divided into two or more IP subnetworks where computers that belong to a same subnet are addressed with the same most-significant bit-group in their IP addresses.

While IP subnets are useful for a variety of purposes, scaling an IP subnet can be challenging due to the amount of broadcast messages sent by each node in the subnet, which causes issues around scalability, security, and operation. For instance, broadcast messages are one of the easiest and most common methods to launch denial-of-service (DoS) attacks, which are major security concerns. Building multiple IP subnets is a solution used to limit the scope of broadcast message, and to improve scalability and security. However, multiple subnets can reduce seamless mobility, and requires additional services such as multicast DNS (mDNS), default gateway nodes, Dynamic Host Configuration Protocol (DHCP) servers, etc., to be deployed and synchronized.

To help scale and secure subnets, techniques have emerged for splitting a subnet into multiple pods that are connected over a layer-3 (e.g., routed) underlay using an overlay network, such as virtual extensible LAN (VxLAN) overlay. Encapsulation protocols, such as VxLAN, are commonly used to stretch layer-2 connections and provide connectivity between data centers, campus networks, and other physical networks. To avoid the same scalability and security issues as in a subnet, these pod solutions rely on the use of nodes on the fabric edge (or "edge nodes") to discover all of the host addresses in the pod. These edge nodes provide proxy services so that hosts in one pod can locate a peer host or a service in another pod without having to broadcast. However, these proxy services are generally limited to locating hosts that have started sending network traffic to be discovered up front. Thus, these techniques may break down when hosts attempt to reach hosts that have not announced their presence (or "silent hosts") by sending network traffic or advertisements.

DESCRIPTION OF EXAMPLE EMBODIMENTS

Overview

Figure 1A:
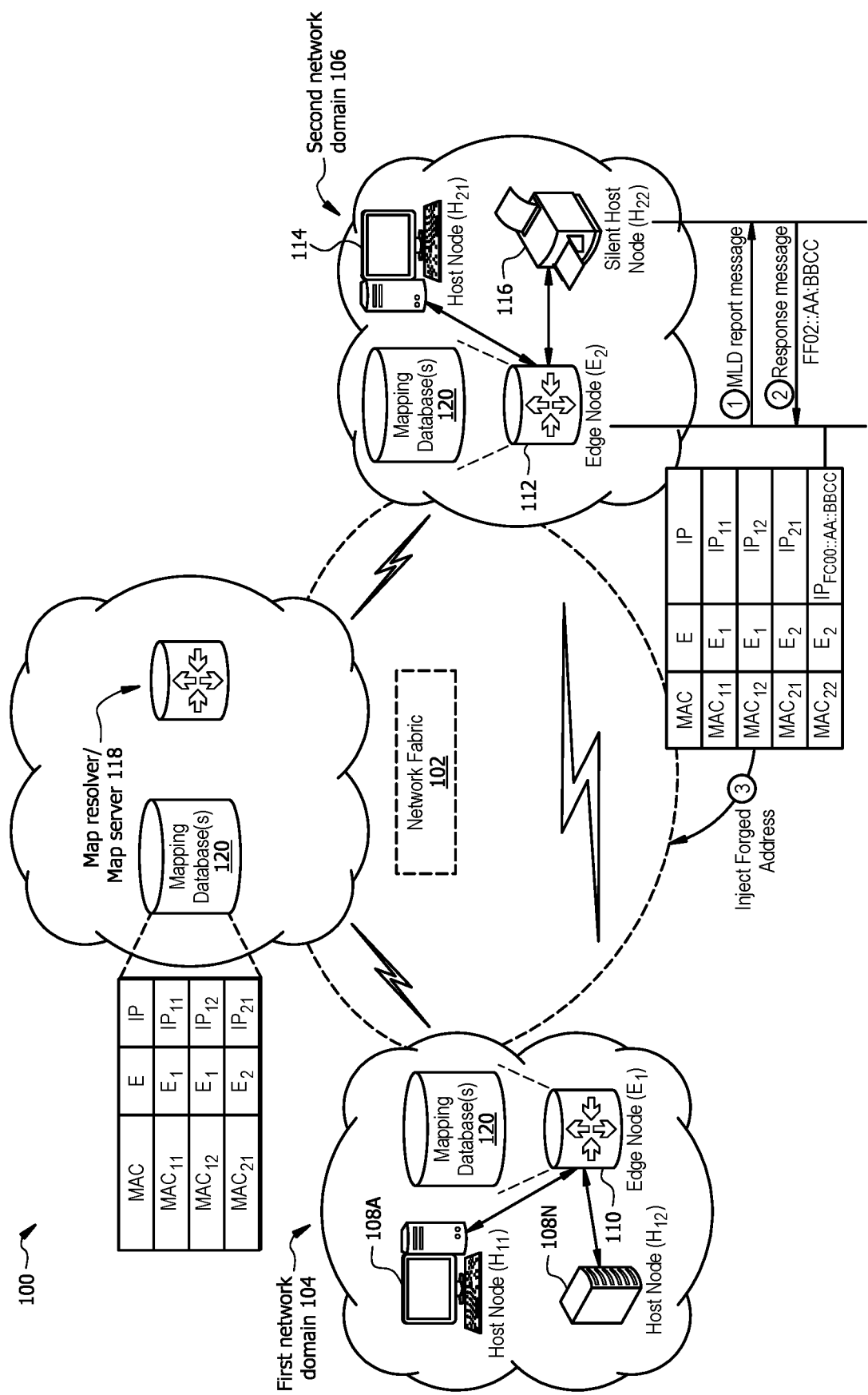
FIG. 1A illustrates a system-architecture diagram of an environment in which an edge node in a network fabric utilizes a multicast listener discovery (MLD) message to identify a multicast address for a silent host node in the network fabric. The edge node determines that the silent host node has not announced a unicast address and uses the multicast address to forge a unicast address for the silent host node that is injected into the network fabric.

According to an embodiment, a method includes receiving, at a first edge node, an Internet Protocol (IP) multicast address of a first silent host node. The method further includes receiving, at a second edge node, an IP multicast address of a second silent host node. The IP multicast address of the first silent host node is equal to the IP multicast address of the second silent host node. The method further includes storing the IP multicast address of the first and second silent host node in a shared entry of a routing table. The method further includes receiving, at a third edge node, a packet from a third host node and determining that a destination address of the packet corresponds to the IP multicast address stored in the shared entry of the routing table. The method further includes sending the packet to both the first host node and the second host node.

According to another embodiment, an edge node in a network fabric includes one or more processors and one or more non-transitory computer-readable media storing computer-executable instructions that, when executed by the one or more processors, cause the one or more processors to perform operations. The operations include receiving a packet from a first host node and accessing a routing table. The operations further include determining that a destination address of the packet corresponds to a shared entry of the routing table, the shared entry comprising an IP multicast address of both a second silent host node and a third silent host node. The operations further include sending the packet to both the second silent host node and the third silent host node.

According to yet another embodiment, one or more computer-readable non-transitory storage media embody instructions that, when executed by a processor, cause the processor to perform operations including receiving, at a first edge node from a first silent host node, an IP multicast address of the first silent host node. The operations further include receiving, at a second edge node from a second silent host node, an IP multicast address of the second silent host node, wherein the IP multicast address of the first silent host node is equal to the IP multicast address of the second silent host node. The operations further include storing the IP multicast address of the first and second silent host nodes in a shared entry of a routing table. The operations further include receiving, at a third edge node, a packet from a third host node and determining that a destination address of the packet corresponds to the IP multicast address stored in the shared entry of the routing table. The operations further include sending the packet to both the first silent host node and the second silent host node.

Technical advantages of certain embodiments of this disclosure may include one or more of the following. Certain systems and methods described herein prevent Solicited-Node multicast address (SNMA) collisions when discovering silent hosts in network fabrics. SNMA collisions may occur in situations where two or more silent host nodes have identical SNMA addresses. Embodiments of this disclosure offer two different approaches to prevent collisions in these situations. First, some embodiments register the identical SNMA address of the two or more silent nodes in a routing table as an anycast address and then use the anycast address to duplicate incoming packets to the silent nodes associated with the shared SNMA address. Second, some embodiments register the shared SNMA address of the two or more silent nodes in a routing table as a true layer-3 multicast address. By offering a solution to discover silent host nodes while avoiding collisions, network bandwidth and computer resources may be optimized. Other technical advantages will be readily apparent to one skilled in the art from the following figures, descriptions, and claims. Moreover, while specific advantages have been enumerated above, various embodiments may include all, some, or none of the enumerated advantages.

EXAMPLE EMBODIMENTS

The present disclosure relates generally to leveraging Multicast Listener Discovery (MLD) capabilities at edge nodes (e.g., router, switch, etc.) of network fabrics to receive Solicited-Node multicast addresses (SNMAs) from silent hosts and resolving SNMA collisions that may occur between the silent hosts. The edge nodes described herein may act as snoopers of MLD reports in order to identify the SNMAs of the silent hosts. The edge nodes then match the SNMAs that they observe from particular media-access control (MAC) addresses of silent hosts, and forge unicast addresses for the silent hosts that match with at least the least three bytes of the SNMAs. The forged unicast addresses are then presented as unicast MAC/IP mappings in the fabric overlay. In situations where a primary IP address lookup fails (e.g., there is no match in the Border Gateway Protocol (BGP) tables), the edge nodes (or other look-up device) performs a secondary lookup that searches for a mapped address that has the last three bytes of the IP address. If a mapping is found having the last three bytes of the IP address, the lookup is sent as a unicast message to the matching MAC address in the mapping. In this way, SNMAs for silent hosts can be used to forge unicast addresses that are injected into a network fabric, and those forged unicast addresses can be used to locate the silent hosts without having to send broadcast messages.

In some situations, SNMA collisions may occur between multiple silent host nodes. This may occur in situations where two or more silent host nodes have identical SNMA addresses. This disclosure offers two different approaches to address this problem. First, some embodiments register the shared SNMA address of the two or more silent nodes in a routing table as an anycast address. Second, some embodiments register the shared SNMA address of the two or more silent nodes in a routing table as a true layer-3 multicast address. Both embodiments are discussed in more detail below in reference to FIG. 1C and FIG. 1D.

Generally, the IPv6 protocol requires that when a host forms an IP version 6 (IPv6) address, the host is required to send an MLD report and also respond to MLD queries for the SNMA that is derived from their IPv6 address. Generally, the SNMA for a host has the last three bytes of the IPv6 address encoded and operates at the scope of a link (e.g., FF02 with the last three bytes of the IPv6 address). While there is generally a one-to-one relationship between the SNMA and unicast addresses due to the rarity of collision of the last three octets, this situation can occur. FIGS. 1C-3 below provide solutions to collisions due to multiple host nodes having identical SNMAs (i.e., having the same last three bytes of their IPv6 addresses).

This disclosure leverages this idea in order to create unicast mappings for silent hosts, or hosts that have not announced their IPv6 addresses (e.g., have not sent traffic into the network fabric). Generally, edge nodes in the network fabrics are tasked with discovering all of the host addresses in their fabric, or device pod. However, issues arise when silent hosts have not announced their IP addresses in the fabric for the edge nodes to discover. This disclosure contemplates configuring the edge nodes with MLD capabilities whereby the edge nodes listen or snoop for MLD reports from hosts in order to discover the SNMAs for the hosts. In this disclosure, the edge nodes match the SNMAs that they observe from a MAC address of a host node and the bindings that the edge node has for that MAC address. However, nodes with SNMAs and no associated bindings indicate silent nodes that have not announced themselves, and no unicast addresses are known for the silent nodes. However, the last three bytes of the SNMAs for the silent nodes will match the last three bytes of the unknown unicast addresses for the silent nodes.

Accordingly, for each SNMA, an edge node may perform a lookup in a matching table to find a matching IPv6 address. However, if no matching IPv6 address is found for an SNMA, the edge node may create a forged unicast address for the node. To create a forged unicast address, the edge node may change the multicast heading into a unicast heading. As an example, the edge node may change "ff02:ab:cdef" into "fc00::ab:cdef" to use for a forged unicast address. Generally, for each forged unicast address, the edge node may, for example, change the heading "0xFF02" into "0xFCXX" where "XX" is well known in the fabric, does not overlap with a unique-local prefix (ULA) in used in the fabric, and defaults to zero. In this way, the SNMAs are used to create forged ULA unicast addresses that are not advertised beyond the layer-2 fabric and do not collide with other addresses.

After generating a forged unicast address for a silent node, the edge node may inject the address into the network fabric, such as by a Locator/ID Separation Protocol (LISP) mapping server (MS) or in ethernet VPN (eVPN) or RIFT fabric. Because the SNMA has been mapped to a forged ULE unicast address, the existing mechanisms in the overlapping mapping system can work according to normal operations, as is.

In the case where a node desires to reach an address owned by a silent node, by definition of a silent node, that address is not known and unavailable in the eVPN control plane. Prior to the techniques described herein, a lookup fails and a broadcast operation would be performed that, as discussed above, increases congestion and opens the fabric to DoS attacks. However, according to the techniques described herein, if the primary lookup fails then the node performing the lookup (e.g., edge switch, edge, router, etc.) may perform a second lookup for the forged unicast address. As a specific example, let "0xabcdef" be the last 3 octets of the address, and the lookup for the forged address may be "fc::ab:cdef."

If the secondary lookup fails, then the edge node may drop the lookup. However, if the secondary lookup succeeds, then the identified unicast address belongs to a silent host and is a forged unicast address. In this case, the edge node forwards the unicast to the silent node, and the unicast may be a neighbor solicitation (NS) for the silent node to verify that the address belongs to it. If the silent node matches, the silent node will answer with a neighbor acknowledgment (NA), and the edge nodes will then learn the actual unicast IP address for the silent node and inject that into the network fabric (e.g., BGP route advertisement).

Embodiments of this disclosure allow for the discovery of silent nodes, or nodes in a network fabric that have not announced themselves (e.g., have not sent traffic into the fabric that indicates their unicast IP address). Rather than having to send broadcast messages to identify nodes, the techniques described herein include configuring edge nodes (or other nodes that manage mapping tables) to snoop for MLD reports, and/or send out MLD queries, in order to identify multicast addresses of the silent nodes (e.g., SNMAs). The edge nodes can discover that the nodes are silent nodes, created forged unicast addresses using at least the last three bytes in the SNMAs, and inject the forged unicast addresses into the network fabric. The forged unicast IP addresses can then be used to reach a silent node (using a unicast message), confirm that existence, and ultimately determine the actual unicast IP address without having to send a broadcast message.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1A illustrates a system-architecture diagram of an environment 100 in which an edge node in a network fabric utilizes a multicast listener discovery (MLD) message to identify a multicast address for a silent host node in the network fabric. The edge node determines that the silent host node has not announced a unicast address and uses the multicast address to forge a unicast address for the silent host node that is injected into the network fabric.

As illustrated, the environment 100 includes a network fabric 102 that includes multiple components, devices, and/or nodes that pass data to each other through interconnecting devices, such as switches, routers, etc. The network fabric 102 may be a layer-2 fabric, a layer-3 fabric, and/or a combination thereof. The network fabric 102 may be an Ethernet network fabric including Ethernet switches (e.g., shortest path bridging, transparent Interconnection of lots of links, etc.). In some instances, the network fabric 102 may be an IP fabric which uses boarder gateway protocol (BGP) and Ethernet virtual private networks (eVPNs). The network fabric 102 may be used to interconnect resources or devices, such as different data centers, different networks (e.g., different campus networks), and or other groupings of devices.

As illustrated, the network fabric 102 may interconnect at least a first network domain 104 and a second network domain 106 where the two domains 104/106 include groupings of devices. In this illustrated example, the network fabric 102 may be at least partially a layer-3 fabric where devices are assigned IP addresses to enable all of the devices in the network fabric to communicate with each other. In such examples, the first network domain 104 and the second network domain 106 may each be separate IP subnet, or may each be separate pods within a same subnet. In either instance, the separate domains 104/106 are assigned or allocated separate IP addresses from a given range of IP addresses. For instance, each of the domains 104/106 may be assigned a range of IP addresses from a Classless Inter-Domain Routing (CIDR) block assigned to an IP subnet in which the domains 104/106 are included.

As illustrated, the first network domain 104 may include multiple host nodes 108A-108N (where "N" is any integer greater than "0"), such as host node H11 and host node H12. The host nodes may be any type of computer node, physical or virtual, that has joined the first network domain 104. Further, the first network domain 104 may include an edge node 110 (E1), which generally acts as a portal for communications with other nodes in the first network domain 104, and/or for devices that are attempting to reach other domains, such as the second network domain 106. Similarly, the second network domain 106 may include an edge node 112, as well as host nodes 114 (H21) and a silent host node 116 (H22).

Generally, the host nodes 108, 114, and the silent host node 116 may be any type of computing device, such as desktop computers, laptop or other portable computers, tablets, e-reader, smartphone, wearable devices, or other computing devices. In some instances, the client devices 104 may be Internet-of-Things (IoT) devices, such as connected appliances, smart home devices, autonomous vehicles or machines, factory devices, sensors, and/or other IoT devices configured to communicate over one or more networks. In various examples, the client devices 104 may be various types of networked devices, such as servers, switches, routers, hubs, bridges, gateways, modems, repeaters, access points, and/or any other type of computing device that may be running any type of software and/or virtualization technology.

The edge nodes 110 and 112 may generally comprise nodes that act as portals for the host nodes to communicate with other devices, and the edge nodes 110 and 112 may include or be gateways, hub, routers, switches, bridges, access points, and/or other types of network communication devices. Generally, the edge nodes 110 and 112 may store and maintain routing tables (or mapping tables) that list the routes to different network destinations. In order for devices in the first network domain 104 and second network domain 106 to communicate with each other, they need to know where to find the devices they would like to reach. That is, the devices in the domain 104 need to know where to send data for a particular IP address, and if that IP address is in the second network domain 104, then a device in the first network domain 104 must be aware of the location of the target device. Accordingly, the edge nodes 110 and 112 may each maintain and/or store mapping database(s) 120 (e.g., routing tables, mapping tables, etc.) that indicate routes to, and mapped IP addresses for, different network endpoints. To send a packet from one IP address to another IP address, the source device needs to have the route to go to the destination device. The edge nodes 110 and 112 that serve the network domains 104 and 106 will track and advertise the list of addresses in their respective domains 104/106. Thus, the edge nodes 110/112 track what devices are in their respective domains 104/106, and periodically, or intermittently, advertise the list of IP addresses to the other edges nodes that have interconnectivity.

Generally, the IPv6 protocol requires that host nodes that form an IPv6 address send an MLD report to edge nodes (e.g., routers, switches, etc.), and also respond to MLD queries for their SNMAs that are derived from the IPv6 addresses. The SNMA has the last three bytes of the IPv6 encoded and operates at the scope of a link (e.g., FF02 along with the last three bytes). There is usually a one-to-one relationship between the SNMA and a unicast address of a node due to the rarity of collision of the last three octets in the IP addresses.

When a host node creates an IPv6 address, the node generally sends traffic at some point, and the edge nodes 110/112 use that traffic to identify the unicast addresses for those nodes. However, some nodes do not "announce" themselves after generating IPv6 addresses, or do not send traffic, and are referred to as silent host nodes 116 as described herein. The silent host node 116 is illustrated as a printer in this case but may be any type of computing device. Accordingly, the edge nodes 110/112 may not have a MAC entry or mapping for the silent host node 116 as the unicast address has not been announced. Thus, when another host node 108 would like to communicate with the silent host node 116, the edge nodes 110/112 do not know the route for the IP address of the silent host node 116 as there is no mapping in their mapping database(s) 120. In such examples, the edge nodes 110/112 may send out broadcast messages to locate the silent host node 116. However, these broadcast messages increase congestion in the network fabric 102 and reduce scalability and security in these deployments.

According to the techniques described herein, the edge nodes 110/112 may be configured to utilized MLD capabilities to receive an SNMA from the silent host node 116, and create a forged unicast addresses from the SNMA for the silent host node 116 that are used as secondary matches in a network overlay if primary unicast address lookups fail. The edge nodes 110/112 described herein may act as snoopers of MLD reports in order to identify the SNMAs of the silent host nodes 116. The edge nodes 110/112 then match the SNMAs that they observe from particular MAC addresses of silent host nodes 116, and forge unicast addresses for the silent host nodes 116 that match with at least the least three bytes of the SNMAs.

For an example, at "1" the edge node 112 may send an MLD report message to the silent host node 116. The MLD report message is used by the edge node 112 to discover multicast listeners, similar to how Internet Group Management Protocol (IGMP) is used in IPv4. The MLD report message may be a general query message to learn which multicast addresses have silent host nodes 116 listening on a link, and/or a multicast-address-specific query to learn if a particular multicast address has any listeners on an attached link.

At "2," the silent host node 116 may send a response to the edge node 112 that indicates a multicast address (e.g., SNMA) on which the silent host node 116 is listening. In this case, the multicast address is "FF02::AA:BBCC" for illustrative purposes. In some instances, the message sent at "2" may simply be the initial MLD report sent by the silent host node 116 when the node 116 forms an IPv6 address and sends the MLD report out. In other instances, the MLD report message may be sent in response to an MLD query for the SNMA that is derived from the IPv6 address. The SNMA sent has the same last three bytes as the IPv6 that was created by the silent host node 116, and the edge node 112 may receive the SNMA for the silent host node 116.

As noted above, silent host nodes 116 have SNMAs, but no associated bindings as they have not announced themselves and no unicast addresses are known for the silent host nodes 116. However, the last three bytes of the SNMAs for the silent host nodes 116 will match the last three bytes of the unknown unicast addresses for the silent host nodes 116. Accordingly, for the received SNMA, the edge node 112 may perform a lookup in a matching table of the mapping database(s) 120 to find a matching IPv6 address.

However, if no matching IPv6 address is found for the SNMA, the edge node 112 may create a forged unicast address for the silent host node 116. To create a forged unicast address, the edge node 112 may change the multicast heading into a unicast heading. As an example, the edge node 112 may change "ff02:ab:cdef" into "fc00::ab:cdef" to use for a forged unicast address. Generally, for each forged unicast address, the edge node 112 may, for example, change the heading "0xFF02" into "0xFCXX" where "XX" is well known in the fabric 102, does not overlap with a unique-local prefix (ULA) in used in the fabric 102, and defaults to zero. In this way, the SNMA is used to create forged ULA unicast addresses that are not advertised beyond the layer-2 fabric and do not collide with other addresses.

After generating a forged unicast address for a silent host node 116, the edge node 112 may, at "3", inject the address into the network fabric 102, such as by a LISP MS 118 or in ethernet VPN (eVPN) fabric. Because the SNMA has been mapped to a forged ULE unicast address, the existing mechanisms in the overlapping mapping system can work according to normal operations, as is. As illustrated, there may be a mapping between the MAC address and the multicast address (SNMA) of the silent host node 116 that indicates that the silent host node 116 is reachable through the edge node 112 (E2).

Figure 1B:
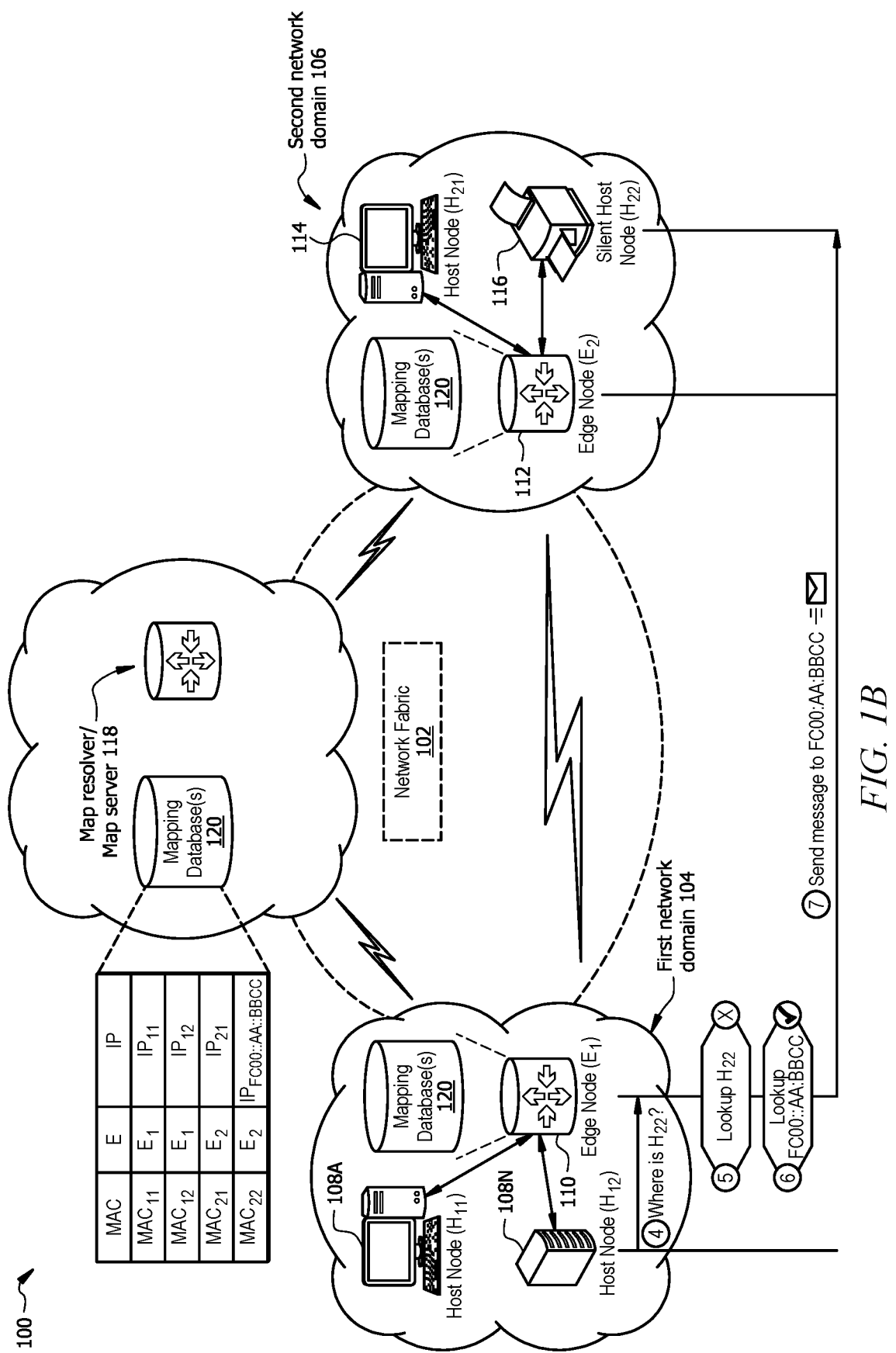
FIG. 1B illustrates a system-architecture diagram of an environment in which another edge node in the network fabric receives the forged unicast address and uses the forged unicast address to send a unicast message to the silent host node.

FIG. 1B illustrates a system-architecture diagram of the environment 100 in which the edge node 110 in the network fabric 102 receives the forged unicast address and uses the forged unicast address to send a unicast message to the silent host node 116.

At "4," the host node 108N may send a request to the edge node 110 to lookup the address for the silent host node 116 (H22). However, in this case where the host node 108N node desires to reach an address owned by the silent host node 116, by definition of a silent node, that address is not known and unavailable in the eVPN control plane. As shown, at "5," the edge node 110 may perform a lookup (e.g., primary lookup) for the unicast address of the silent host node 116 that was provided by the host node 108N, but the primary lookup fails in this instance.

Prior to the techniques described herein, when the primary lookup fails, a broadcast operation would be performed that increases congestion and opens the fabric to DoS attacks. However, according to the techniques described herein, if the primary lookup fails then the edge node 110 may perform a secondary lookup look up for the forged unicast address. As a specific example, let "0xabcdef" be the last 3 octets of the address, and the lookup for the forged address may be "fc::ab:cdef" If the secondary lookup fails, then the edge node 110 may drop the lookup.

However, if the secondary lookup succeeds, then the identified unicast address may belong to the silent host node 116 and is a forged unicast address. In this case, the edge node 110 forwards the unicast to the silent host node 116 at "6," and the unicast may be a neighbor solicitation (NS) message for the silent host node 116 to verify that the address belongs to it. If the silent host node 116 matches, the silent host node 116 will answer with a neighbor acknowledgment (NA), and the edge nodes 110/112 will then learn the actual unicast IP address for the silent host node 116 and inject that into the network fabric 102 (e.g., BGP route advertisement). Thus, embodiments of this disclosure allows for the discovery of silent host nodes 116, or nodes in a network fabric that have not announced themselves (e.g., have of 33 not sent traffic into the fabric that indicates their unicast IP address). Rather than having to send broadcast messages to identify silent host nodes 116, the techniques described herein include configuring edge nodes 110/112 (or other nodes that manage mapping tables 120) to snoop for MLD reports, and/or send out MLD queries, in order to identify multicast addresses of the silent host nodes 116 (e.g., SNMAs). The edge nodes 110/112 can discover that the nodes are silent host nodes 116, created forged unicast addresses using at least the last three bytes in the SNMAs, and inject the forged unicast addresses into the network fabric 102. The forged unicast IP addresses can then be used to reach a silent host node 116 (using a unicast message), confirm that existence, and ultimately determine the actual unicast IP address without having to send a broadcast message.

Generally, the network fabric 102 may include and/or be comprised of devices housed or located in one or more data centers connected by various networks. The network fabric 102 may include one or more networks implemented by any viable communication technology, such as wired and/or wireless modalities and/or technologies. The network fabric 102 may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. The network fabric 102 may include devices, virtual resources, or other nodes that relay packets from one network segment to another by nodes in the computer network. The network fabric 102 may include multiple devices that utilize the network layer (and/or session layer, transport layer, etc.) in the OSI model for packet forwarding, and/or other layers. The network fabric 102 may include various hardware devices, such as routers, switches, gateways, smart NICs, NICs, ASICs, FPGAs, servers, and/or any other type of device. Further, the network fabric 102 may include virtual resources, such as VMs, containers, and/or other virtual resources.

In some instances, network fabric 102 may include one or more data centers. The one or more data centers may be physical facilities or buildings located across geographic areas that designated to store networked devices that are part of the network fabric 102. The data centers may include various networking devices, as well as redundant or backup components and infrastructure for power supply, data communications connections, environmental controls, and various security devices. In some examples, the data centers may include one or more virtual data centers which are a pool or collection of cloud infrastructure resources specifically designed for enterprise needs, and/or for cloud-based service provider needs. Generally, the data centers (physical and/or virtual) may provide basic resources such as processor (CPU), memory (RAM), storage (disk), and networking (bandwidth). However, in some examples the devices in the network fabric 102 may not be located in explicitly defined data centers, but may be located in other locations or buildings.

Figure 1C:
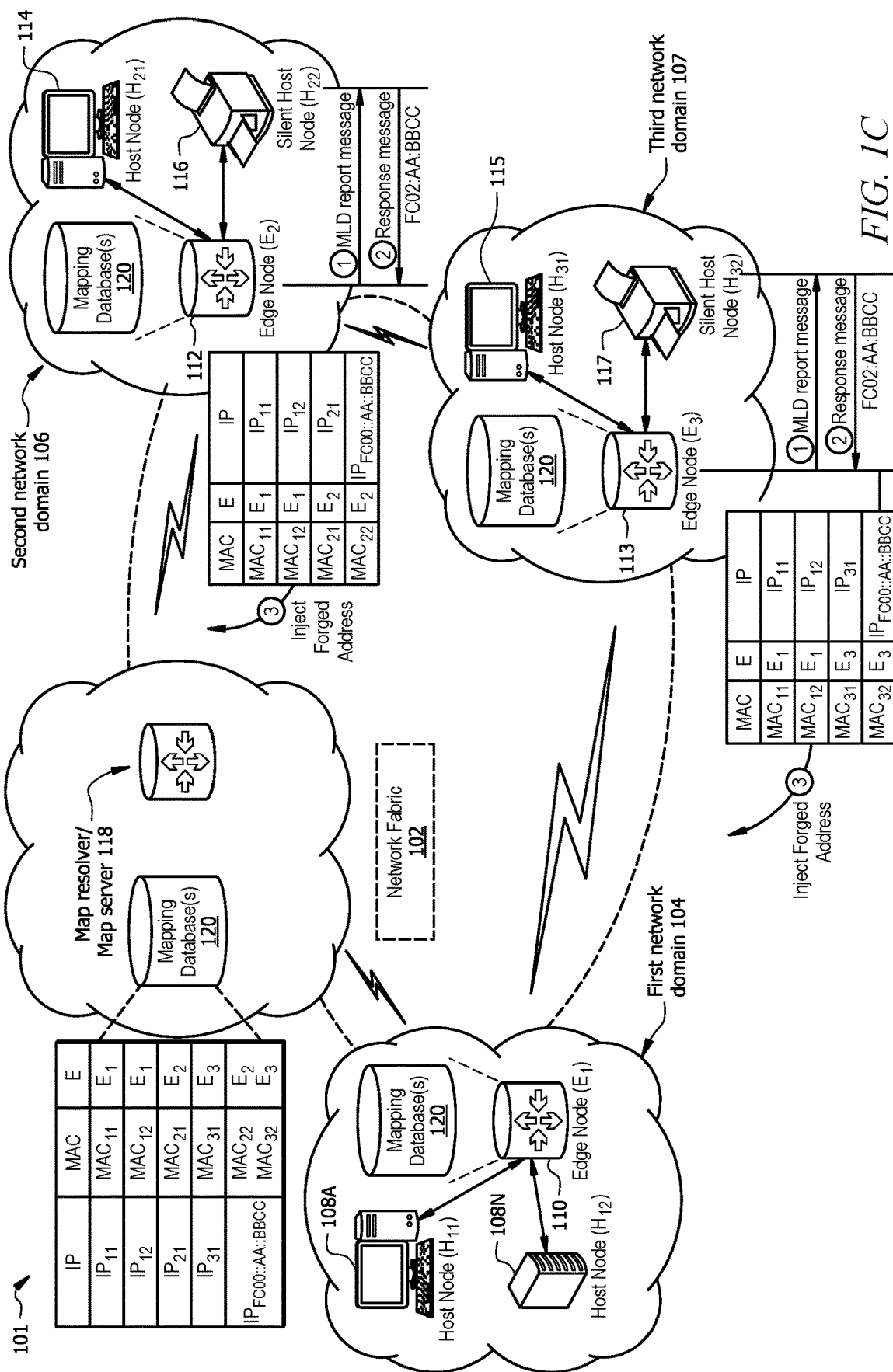
FIG. 1C illustrates a system-architecture diagram of an environment in which multiple edge nodes utilize MLD messages to identify multicast addresses for multiple silent host nodes. Each edge node determines that a silent host node has not announced a unicast address and uses the multicast address to forge a unicast address for the silent host node that is injected into the network fabric. At least two silent host nodes have identical multicast addresses, which would typically result in collisions.

FIG. 1C illustrates a system-architecture diagram of an environment 101 in which multiple edge nodes utilize MLD messages to identify multicast addresses (e.g., SNMAs) for multiple silent host nodes. Each edge node determines that a silent host node has not announced a unicast address and uses the multicast address to forge a unicast address for the silent host node that is injected into the network fabric. At least two silent host nodes have identical multicast addresses, which would typically result in collisions.

Similar to environment 100, environment 101 includes a network fabric 102 that includes multiple components, devices, and/or nodes that pass data to each other through interconnecting devices, such as switches, routers, etc. The network fabric 102 may be a layer-2 fabric, a layer-3 fabric, and/or a combination thereof. The network fabric 102 may be an Ethernet network fabric including Ethernet switches (e.g., shortest path bridging, transparent Interconnection of lots of links, etc.). In some instances, the network fabric 102 may be an IP fabric which uses BGP and eVPNs. The network fabric 102 may be used to interconnect resources or devices, such as different data centers, different networks (e.g., different campus networks), and or other groupings of devices.

As illustrated, the network fabric 102 may interconnect at least a first network domain 104, a second network domain 106, and a third network domain 107 where the three domains 104/106/107 include groupings of devices. In this illustrated example, the network fabric 102 may be at least partially a layer-3 fabric where devices are assigned IP addresses to enable all of the devices in the network fabric to communicate with each other. In such examples, the first network domain 104, the second network domain 106, and the third network domain 107 may each be separate IP subnets, or may each be separate pods within a same subnet. In either instance, the separate domains 104/106/107 are assigned or allocated separate IP addresses from a given range of IP addresses. For instance, each of the domains 104/106/107 may be assigned a range of IP addresses from a CIDR block assigned to an IP subnet in which the domains 104/106/107 are included.

As illustrated, the first network domain 104 may include multiple host nodes 108A-108N (where "N" is any integer greater than "0"), such as host node H11 and host node H12.

The host nodes may be any type of computer node, physical or virtual, that has joined the first network domain 104. Further, the first network domain 104 may include an edge node 110 (E1), which generally acts as a portal for communications with other nodes in the first network domain 104, and/or for devices that are attempting to reach other domains, such as the second network domain 106. Similarly, the second network domain 106 may include an edge node 112 (E2), a host node 114 (H21), and a silent host node 116 (H22), and the third network domain 107 may include an edge node 113 (E3), a host node 115 (H31), and a silent host node 117 (H32).

Generally, the host nodes 108, 114, and 115 and the silent host nodes 116 and 117 may be any type of computing device, such as desktop computers, laptop or other portable computers, tablets, e-reader, smartphone, wearable devices, or other computing devices. In some instances, the client devices 104 may be Internet-of-Things (IoT) devices, such as connected appliances, smart home devices, autonomous vehicles or machines, factory devices, sensors, and/or other IoT devices configured to communicate over one or more networks. In various examples, the client devices 104 may be various types of networked devices, such as servers, switches, routers, hubs, bridges, gateways, modems, repeaters, access points, and/or any other type of computing device that may be running any type of software and/or virtualization technology.

The edge nodes 110, 112, and 113 may generally comprise nodes that act as portals for the host nodes to communicate with other devices, and the edge nodes 110, 112, and 113 may include or be gateways, hub, routers, switches, bridges, access points, and/or other types of network communication devices. Generally, the edge nodes 110, 112, and 113 may store and maintain routing tables (or mapping tables) that list the routes to different network destinations. In order for devices in the first network domain 104, second network domain 106, and third network domain 107 to communicate with each other, they need to know where to find the devices they would like to reach. That is, the devices in the domain 104 need to know where to send data for a particular IP address, and if that IP address is in the second network domain 104, then a device in the first network domain 104 must be aware of the location of the target device. Accordingly, the edge nodes 110, 112, and 113 may each maintain and/or store mapping database(s) 120 (e.g., routing tables, mapping tables, etc.) that indicate routes to, and mapped IP addresses for, different network endpoints. To send a packet from one IP address to another IP address, the source device needs to have the route to go to the destination device. The edge nodes 110, 112, and 113 that serve the network domains 104, 106, and 107 will track and advertise the list of addresses in their respective domains 104/106/107. Thus, the edge nodes 110/112/113 track what devices are in their respective domains 104/106/107, and periodically, or intermittently, advertise the list of IP addresses to the other edges nodes that have interconnectivity.

Generally, the IPv6 protocol requires that host nodes that form an IPv6 address send an MLD report to edge nodes (e.g., routers, switches, etc.), and also respond to MLD queries for their SNMAs that are derived from the IPv6 addresses. The SNMA has the last three bytes of the IPv6 encoded and operates at the scope of a link (e.g., FF02 along with the last three bytes).

When a host node creates an IPv6 address, the node generally sends traffic at some point, and the edge nodes 110/112/113 use that traffic to identify the unicast addresses for those nodes. However, some nodes do not "announce" themselves after generating IPv6 addresses, or do not send traffic, and are referred to as silent host nodes 116/117 as described herein. The silent host nodes 116/117 are illustrated as printers in this example but may be any type of computing device. Accordingly, the edge nodes 110/112/113 may not have a MAC entry or mapping for the silent host nodes 116/117 as the unicast addresses have not been announced. Thus, when another host node 108 would like to communicate with the silent host nodes 116/117, the edge nodes 110/112/113 do not know the route for the IP address of the silent host node 116/117 as there is no mapping in their mapping database(s) 120. In such examples, the edge nodes 110/112/113 may send out broadcast messages to locate the silent host node 116/117. However, these broadcast messages increase congestion in the network fabric 102 and reduce scalability and security in these deployments.

To address these problems, edge nodes 110/112/113 may be configured to utilized MLD capabilities to receive an SNMA from silent host node 116/117, and create a forged unicast addresses from the SNMA for the silent host node 116/117 that are used as secondary matches in a network overlay if primary unicast address lookups fail. The edge nodes 110/112/113 described herein may act as snoopers of MLD reports in order to identify the SNMAs of the silent host nodes 116/117. The edge nodes 110/112/113 then match the SNMAs that they observe from particular MAC addresses of silent host nodes 116/117 and forge unicast addresses for the silent host nodes 116/117 that match with at least the least three bytes of the SNMAs.

For example, at "1", edge node 112/113 sends an MLD report message to silent host node 116/117. The MLD report message is used by the edge node 112/113 to discover multicast listeners, similar to how IGMP is used in IPv4. The MLD report message may be a general query message to learn which multicast addresses have silent host nodes 116/117 listening on a link, and/or a multicast-address-specific query to learn if a particular multicast address has any listeners on an attached link.

At "2," the silent host node 116/117 sends a response to the edge node 112/113 that indicates a multicast address (e.g., SNMA) on which the silent host node 116/117 is listening. In some instances, the message sent at "2" may simply be the initial MLD report sent by the silent host node 116/117 when the node 116/117 forms an IPv6 address and sends the MLD report out. In other instances, the MLD report message may be sent in response to an MLD query for the SNMA that is derived from the IPv6 address. The SNMA sent has the same last three bytes as the IPv6 that was created by the silent host node 116/117, and the edge node 112/113 may receive the SNMA for the silent host node 116/117. In this case, the multicast address is "FF02::AA:BBCC" for both silent host nodes 116/177 for illustrative purposes (i.e., the last three bytes of the IPv6 addresses for silent host nodes 116/117 are identical). Typically, having identical SNMA addresses for silent host nodes 116/117 would cause collisions. However, as described in more detail below, embodiments of the disclosure provide solutions to resolve such collisions.

As noted above, silent host nodes 116/117 have SNMAs, but no associated bindings as they have not announced themselves and no unicast addresses are known for the silent host nodes 116/117. However, the last three bytes of the SNMAs for the silent host nodes 116/117 will match the last three bytes of the unknown unicast addresses for the silent host nodes 116/117. Accordingly, for the received SNMA, the edge node 112/113 may perform a lookup in a matching table of the mapping database(s) 120 to find a matching IPv6 address. However, if no matching IPv6 address is found for the SNMA, the edge node 112/113 may create a forged unicast address for the silent host node 116/117. To create a forged unicast address, the edge node 112/113 may change the multicast heading into a unicast heading. As an example, the edge node 112/113 may change "FF02:AA:BBCC" into "FC00::AA:BBCC" to use for a forged unicast address. Generally, for each forged unicast address, the edge node 112/113 may, for example, change the heading "0xFF02" into "0xFCXX" where "XX" is well known in the fabric 102, does not overlap with a unique-local prefix (ULA) in used in the fabric 102, and defaults to zero. In this way, the SNMA is used to create forged ULA unicast addresses that are not advertised beyond the layer-2 fabric and do not collide with other addresses.

After generating a forged unicast address for silent host nodes 116/117, edge nodes 112/113, at "3", inject the addresses into the network fabric 102, such as by a LISP MS 118 or in eVPN fabric. Because the SNMAs have been mapped to forged ULE unicast addresses, the existing mechanisms in the overlapping mapping system can work according to normal operations, as is. As illustrated, there may be a mapping between the MAC address and the multicast address (SNMA) of the silent host node 116/117 that indicates that the silent host node 116/117 is reachable through the edge node 112/113.

Because silent host nodes 116/117 have identical SMNAs (i.e., "FF02:AA:BBCC"), they also have identical forged unicast addresses (i.e., "FC00::AA :BBCC"). When the forged unicast addresses that correspond to the SMNAs get stored in a routing/host table (e.g., in mapping database(s) 120), some embodiments store the forged unicast addresses as anycast addresses. For example, as illustrated in FIG. 1C, the forged unicast address shared by both silent host nodes 116 and 117 (i.e., "FC00::AA:BBCC") is stored in a shared entry 121 in a routing/host table of mapping database(s) 120. Shared entry 121 may include the forged unicast address shared by both silent host nodes 116 and 117 (i.e., "FC00:: AA:BBCC"), a MAC address of silent host node 116 (MAC22), a MAC address of silent host node 117 (MAC32), and a list of one or more edge nodes (E2 and E3) where silent host nodes 116/117 may be reached. Shared entry 121 may be used to duplicate packets to both silent host nodes 116 and 117 in order to avoid collisions, as described in more detail below in reference to FIG. 1B.

Figure 1D:
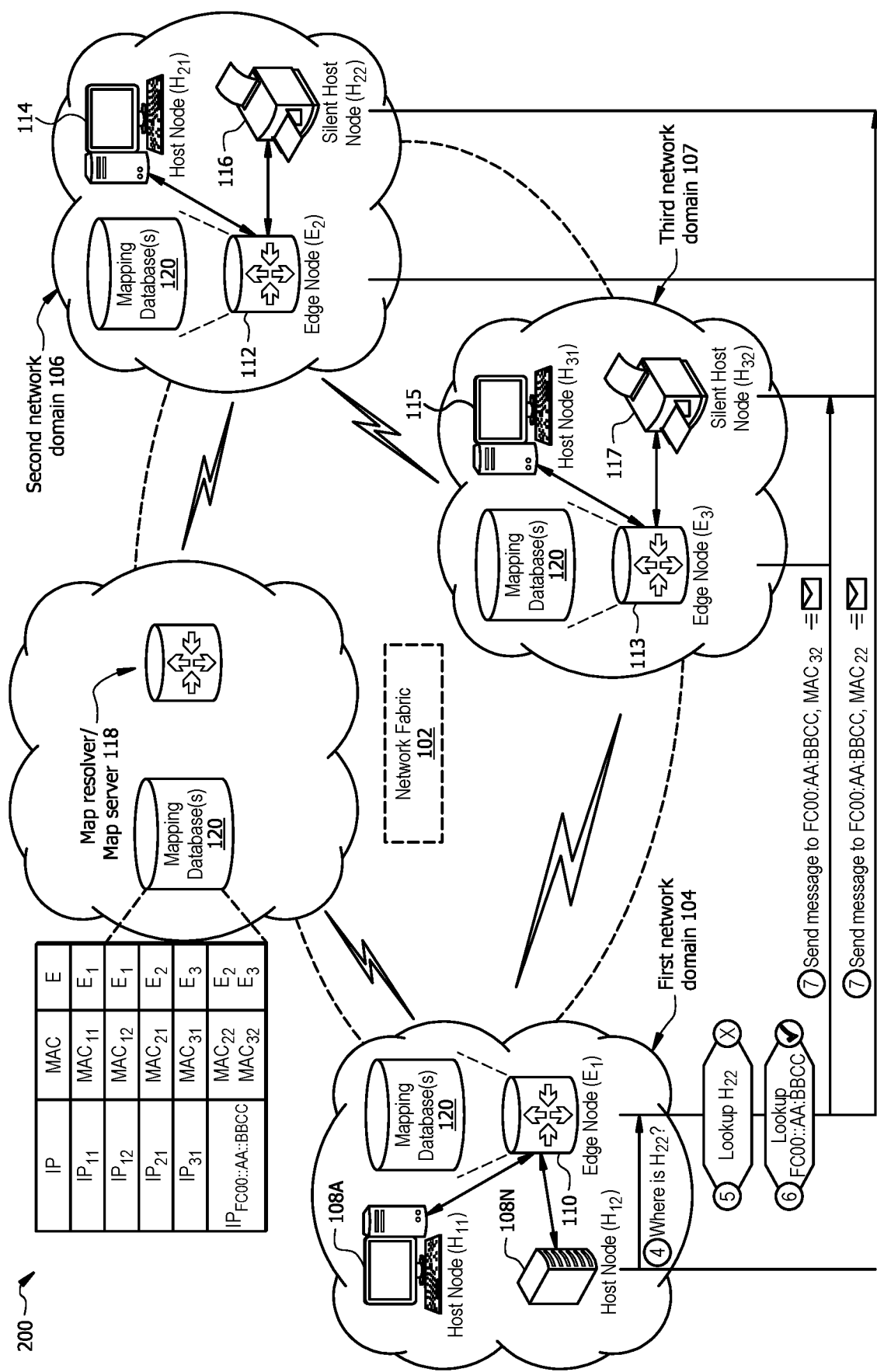
FIG. 1D illustrates a system-architecture diagram of an environment in which another edge node in the network fabric of FIG. 1C receives the forged unicast address and uses the forged unicast address to send duplicate unicast messages to multiple silent host nodes, thereby resolving any collisions that would typically occur due to identical multicast addresses for multiple silent host nodes.

FIG. 1D illustrates a system-architecture diagram of the environment 101 in which the edge node 110 in the network fabric 102 receives the forged unicast address and uses the forged unicast address to send duplicate unicast messages to the silent host nodes 116/117 (i.e., using anycast). At "4," the host node 108N sends a request to the edge node 110 to lookup the address for the silent host node 116 (H22). However, in this case where the host node 108N node desires to reach an address owned by the silent host node 116, by definition of a silent node, that address is not known and unavailable in the eVPN control plane. As shown, at "5," the edge node 110 performs a lookup (e.g., primary lookup) for the unicast address of the silent host node 116 that was provided by the host node 108N, but the primary lookup fails in this instance. Prior to the techniques described herein, when the primary lookup fails, a broadcast operation would be performed that increases congestion and opens the fabric to DoS attacks. However, according to the techniques described herein, if the primary lookup fails at "5" then the edge node 110 may perform a secondary lookup for the forged unicast address at "6". As a specific example, let "0xAABBCC" be the last 3 octets of the address, and the lookup for the forged address may be "fc::AA:BBCC." If the secondary lookup fails, then the edge node 110 may drop the lookup. However, if the secondary lookup succeeds (i.e., "fc::AA:BBCC" is found to match shared entry 121), then the identified unicast address may belong to either silent host node 116 or 117 and is a forged unicast address. In this case, the edge node 110 duplicates and sends the unicast to both silent host node 116 and silent host node 117 at "7," and the unicast may be a neighbor solicitation (NS) message for the silent host node 116/117 to verify that the address belongs to it. If the silent host node 116 matches, the silent host node 116 will answer with a neighbor acknowledgment (NA), and the edge nodes 110/112/113 will then learn the actual unicast IP address for the silent host node 116 and inject that into the network fabric 102 (e.g., BGP route advertisement) Likewise, if the silent host node 117 matches, the silent host node 117 will answer with a neighbor acknowledgment (NA), and the edge nodes 110/112/113 will then learn the actual unicast IP address for the silent host node 117 and inject that into the network fabric 102 (e.g., BGP route advertisement).

Thus, embodiments of this disclosure allows for the discovery of silent host nodes 116/117, or nodes in a network fabric that have not announced themselves (e.g., have not sent traffic into the fabric that indicates their unicast IP address). Rather than having to send broadcast messages to identify silent host nodes 116/117, the techniques described herein include configuring edge nodes 110/112/113 (or other nodes that manage mapping tables 120) to snoop for MLD reports, and/or send out MLD queries, in order to identify multicast addresses of the silent host nodes 116/117 (e.g., SNMAs). The edge nodes 110/112/113 can discover that the nodes are silent host nodes 116/117, created forged unicast addresses using at least the last three bytes in the SNMAs, and inject the forged unicast addresses into the network fabric 102. The forged unicast IP addresses can then be used to reach silent host nodes 116/117 (using a unicast message), confirm that existence, and ultimately determine the actual unicast IP address without having to send a broadcast message.

In alternate embodiments, rather than registering SNMAs as anycast addresses in a host/routing table as described above in reference to FIGS. 1C and 1D, environment 101 may register the SNMAs to the host table and a multicast routing table as true layer-3 multicast addresses. For example, TABLES 1 and 2 below illustrate an example host and multicast routing table using the example SMNAs above.

TABLE 1

| Host Table | | |
|---|---|---|
| MAC | EDGE NODE | IP |
| $MAC_{11}$ | $E_1$ | $IP_{11}$ |
| $MAC_{12}$ | $E_1$ | $IP_{12}$ |
| $MAC_{21}$ | $E_2$ | $IP_{21}$ |
| $MAC_{31}$ | $E_3$ | $IP_{31}$ |
| 3333:A:B:C | MCAST | FC00::AA:BBCC |

TABLE 2

| Multicast Routing Table | |
|---|---|
| MCAST | Listeners |
| FC00::AA:BBCC | $E_2$ |
| | $E_3$ |

In these embodiments, every listener that is discovered is added into the multicast group. The network maintains the SNMA multicast group as any other layer-3 multicast group. When a search packet has an unknown target that matches the SNMA, it is forwarded through the multicast forwarding system and delivered only to the listeners for this SNMA (i.e., no broadcast). In some embodiments, a link local multicast (e.g., "FF02::A:BC") is encapsulated to a global multicast group (e.g., "FF0E::A:BC").

Figure 2:
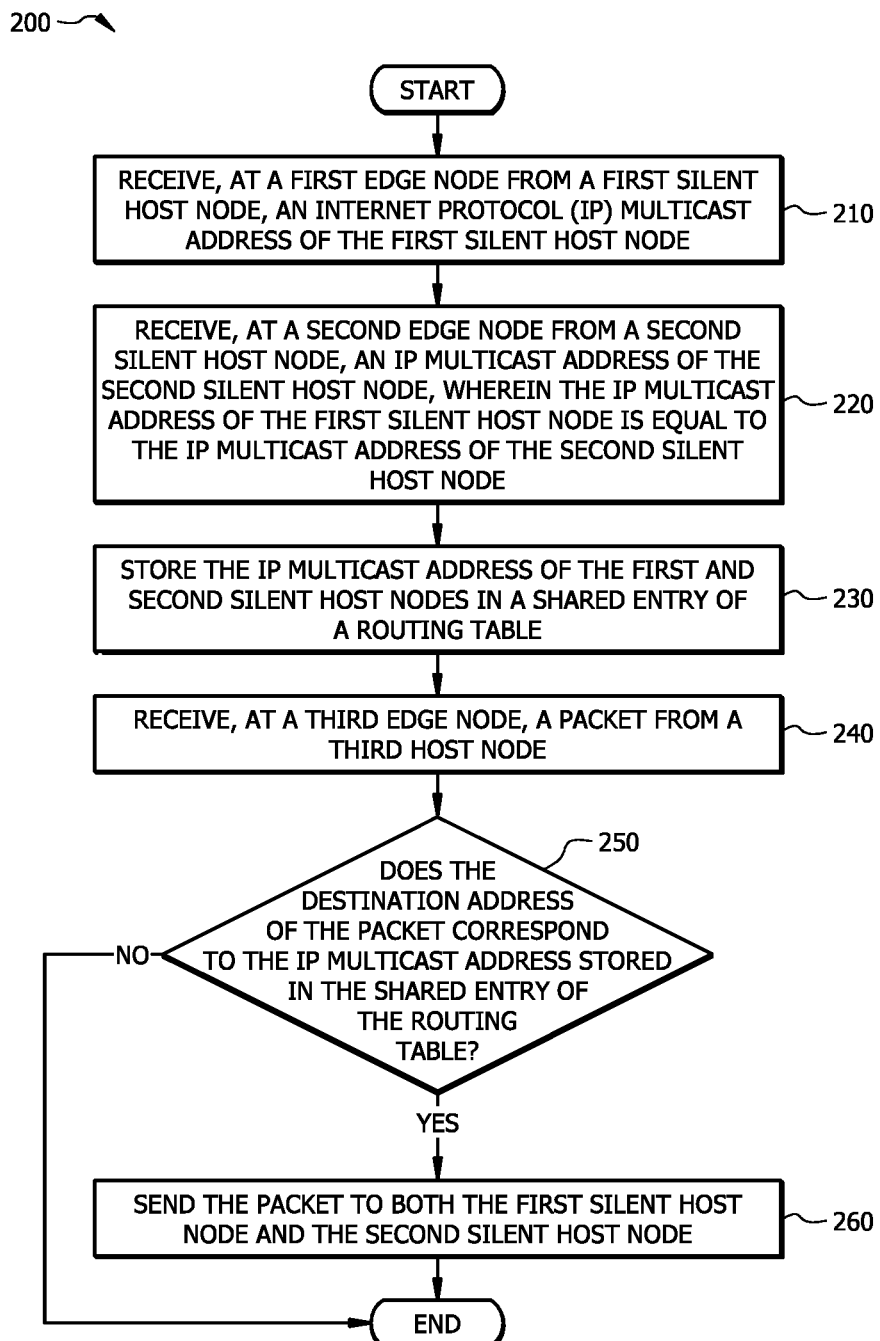
FIG. 2 illustrates a flow diagram of an example method for using anycast to resolve collisions due to multiple silent host nodes having identical multicast addresses.

FIG. 2 illustrates a flow diagram of an example method 200 that illustrates aspects of the functions performed at least partly by the devices described in FIGS. 1C and 1D, such as the edge nodes 110/112/113, MS/MR 118, and so forth. The logical operations described herein with respect to FIGS. 1C and 1D may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIG. 2 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

In some instances, the steps of method 200 may be performed by a device and/or a system of devices that includes one or more processors and one or more non-transitory computer-readable media storing computer-executable instructions that, when executed by the one or more processors, cause the one or more processors to perform operations of method 200.

Specifically, FIG. 2 illustrates a flow diagram of an example method 200 for using anycast to prevent collisions due to multiple silent host nodes having identical multicast addresses. The edge nodes use the multicast addresses of silent host nodes to forge unicast addresses for the silent host nodes that are injected into the network fabric. If two silent host nodes have identical multicast addresses (e.g., SNMAs), their information is stored in a shared entry in a routing/host table as an anycast address that is then used to duplicate packets to both silent host nodes. This prevents collisions and conserves network and computer resources such as memory and processing power.

At step 210, method 200 receives, at a first edge node from a first host node, an IP multicast address of the first silent host node. In some embodiments, the IP multicast address of the first silent host node is an SNMA. In some embodiments, the first edge node is an edge node such as edge node 112. In some embodiments, the first silent host node is a silent host node such as silent host node 116. In some embodiments, the IP multicast address of the first silent host node is sent by the first silent host node to the first edge node in response to the first edge node sending an MLD query message to the first silent host node.

At step 220, method 200 receives, at a second edge node from a second silent host node, an IP multicast address of the second silent host node, wherein the IP multicast address of the first silent host node is equal to the IP multicast address of the second silent host node. In some embodiments, the IP multicast address of the second silent host node is an SNMA. In some embodiments, the second edge node is an edge node such as edge node 113. In some embodiments, the second silent host node is a silent host node such as silent host node 117. In some embodiments, the IP multicast address of the second silent host node is sent by the second silent host node to the second edge node in response to the second edge node sending a MLD query message to the second silent host node.

At step 230, method 200 stores the IP multicast address of the first and second silent host nodes in a shared entry of a routing table. In some embodiments, the shared entry is shared entry 121. In some embodiments, the shared entry includes the IP multicast address of the first and second silent host node of steps 210 and 220, a MAC address of the first silent host node, a MAC address of the second silent host node, and a list of one or more edge nodes associated with the first and second silent host nodes. In some embodiments, the shared entry is stored in a routing table of a mapping system associated with the first, second, and third edge nodes (e.g., mapping database 120 of map resolver/map server 118). In some embodiments, the IP multicast address stored in the shared entry of the routing table in step 230 is a forged IP unicast address. In some embodiments, the forged IP unicast address has the same last three bytes (or a different number than three) of the SNMA of the first and second silent host nodes.

In some embodiments, step 230 includes the first and second edge nodes sending the forged IP unicast address to at least one of a second edge node in a second network fabric or a mapping system associated with the first network fabric and the second network fabric. As an example, the first edge node may advertise, such as through a BGP advertisement, updated routing tables that include a binding for the MAC address of the first silent host node and the forged IP unicast address of the first silent host node. The updated routing table may indicate that the first silent host node is reachable through a routing path sent to the first edge node. Similarly, the second edge node may advertise, such as through a BGP advertisement, updated routing tables that include a binding for the MAC address of the second silent host node and the forged IP unicast address of the second silent host node. The updated routing table may indicate that the second silent host node is reachable through a routing path sent to the second edge node.

As another example, the first and second edge nodes in step 230 may send updated routing information to a controller associated with the network fabric in instances where an SDN controller performs various control-plane operations for the network fabric. For instance, a map resolver-map server 118 may maintain and distribute updated mapping databases 120 based on information received from the various edge nodes in the network fabric 102 (e.g., updated mapping databases holding routing/mapping tables). Ultimately, the updated routing tables or information is accessible by other edge nodes.

At step 240, method 200 receives, at a third edge node, a packet from a third host node. In some embodiments, the third edge node is an edge node such as edge node 110. In some embodiments, the packet is destined for one of either the first silent host node or the second silent host node.

At step 250, method 200 determines whether the destination address of the packet of step 240 corresponds to the IP multicast address stored in the shared entry of the routing table. For instance, method 200 may determine that the last three bytes of the destination address of the packet corresponds to the forged IP unicast address of the shared entry of step 230 (i.e., the forged IP unicast address for the first and second silent host nodes). If method 200 determines in step 230 that the destination address of the packet corresponds to the IP multicast address stored in the shared entry of the routing table, method 200 proceeds to step 260. Otherwise, method 200 may end.

At step 260, method 200 sends the packet to both the first silent host node and the second silent host node. That is, the packet received in step 240 is duplicated to both the first silent host node and the second silent host node using the anycast address stored in the shared entry of the routing table. As a result, the packet is forwarded to all possible destination silent host nodes without broadcasting the packet to all nodes of the network. This reduces network traffic and computing resources that are typically required for broadcast operations.

As described above, some embodiments learn and store SNMAs in a host table. However, this may lead to the host table growing to an unacceptable size since each real address may have an SNMA counterpart. This may present scalability concerns for some implementations. To address this problem, some embodiments utilize a method 300 described below for solving this increase in size of the host table. In general, the first address stored in the host table for a particular node can be either the SNMA or the real address. When a second address for the node is discovered, certain embodiments only keep/store the real address and remove the SNMA. When a search is intercepted at an edge node, a lookup is performed on the table for the best match. For example, the best match may be defined as 1) prefer the full address, and 2) performs pattern matching on the last three bytes of the search address. In some embodiments, this search may be executed as a single operation using a binary tree. Method 300 for controlling the size of a host table is described in more detail below.

Figure 3:
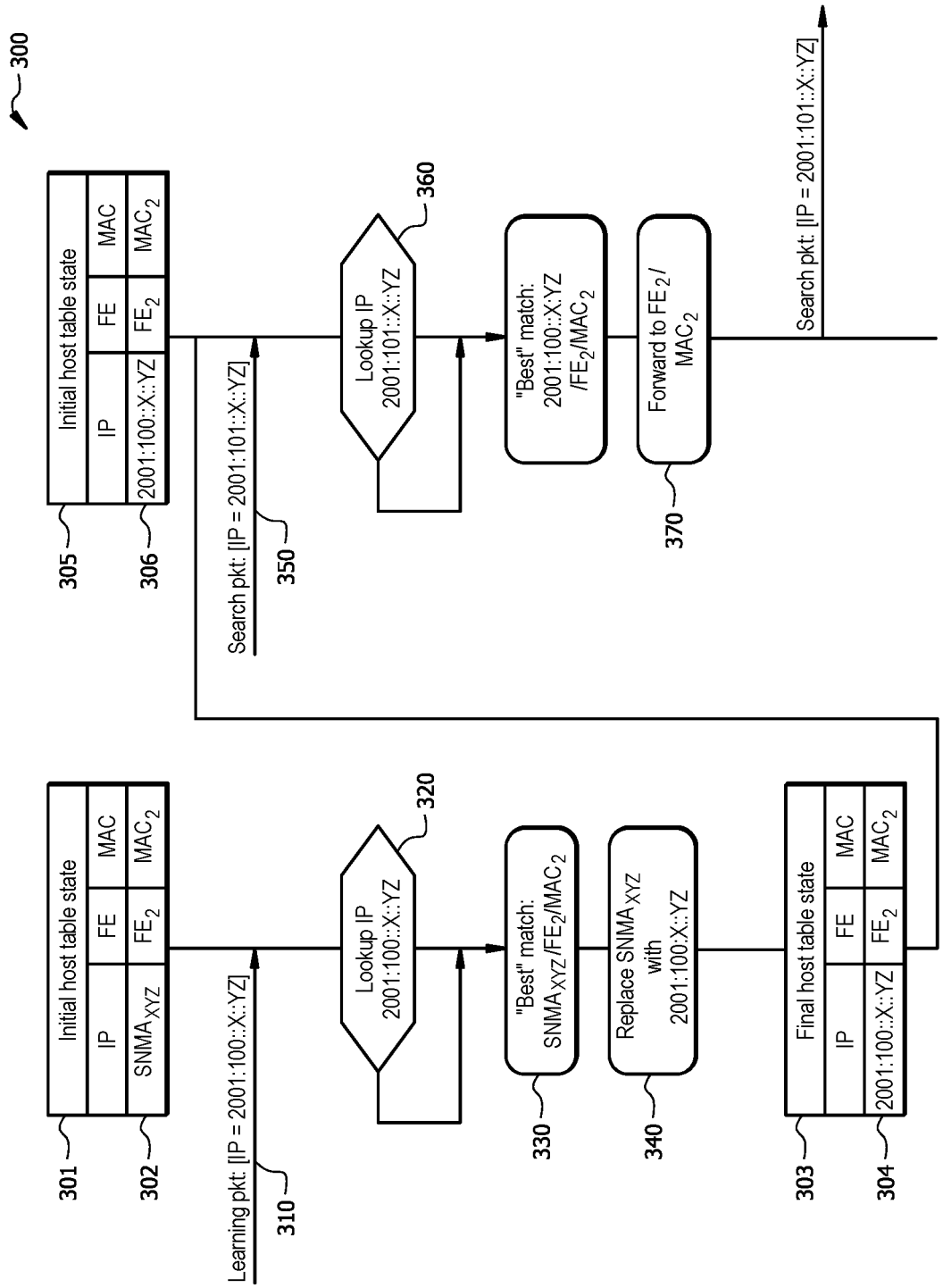
FIG. 3 illustrates a flow diagram of an example method for optimizing a routing/host table that includes multicast addresses.

FIG. 3 illustrates a flow diagram of an example method 300 for optimizing a routing/host table that includes multicast addresses (e.g., SMNAs). Method 300 may begin in step 310 where method 300 receives a learning packet. In some embodiments, the learning packet may be received at an edge node such as edge node 110. The learning packet may include a destination IP address. For illustrative purposes, the destination IP address may be "2001:100::X::YZ."

In step 320, method 300 performs a lookup on the host table using the destination address of step 310. For example, an edge node may perform a lookup on the host table to determine whether there is an IP address in the host table that matches the destination address of step 310 (e.g., whether "2001:100::X::YZ" is in the host table). If the complete IP address is found, method 300 may end. Otherwise, method 300 may proceed to step 330. For illustrative purposes, the initial host table 301 does not include the destination address "2001:100::X::YZ", therefore method 300 would proceed to step 330.

In step 330, method 300 performs a lookup on the host table using, for example, the last three bytes of the destination address of step 310. If a match is found, method 300 proceeds to step 340. Otherwise, method 300 may end. In this example, method 300 searches the initial host table 301 for "X::YZ" (i.e., the last three bytes of the destination address of step 310) and determines that entry 302 of the initial host table 301 is a match (i.e., SMNAxyz matches the last three bytes of the destination address of step 310).

In step 340, method 300 replaces the SMNA of step 330 with the destination address of step 310. In this example, SMNAxyz is replaced with "2001:100::X::YZ". This results in a final host table 303 that includes an entry 304 containing the destination address of "2001:100::X::YZ" rather than SMNAxyz.

At step 350, method 300 receives a search packet. In some embodiments, the search packet may be received at an edge node such as edge node 110. The search packet may include a destination IP address. For illustrative purposes, the destination IP address may be "2001:100::X::YZ."

In step 360, method 300 performs a lookup on the host table using the destination address of step 350. For example, an edge node may perform a lookup on the host table to determine whether there is an IP address in the host table that matches the destination address of step 350 (e.g., whether "2001:100::X::YZ" is in the host table). In this example, the initial host table 305 includes the destination address "2001:100::X::YZ" at entry 306. Therefore, method 300 proceeds to step 370 where the search packet of step 350 is forwarded to the edge node and MAC address of entry 306.

Figure 4:
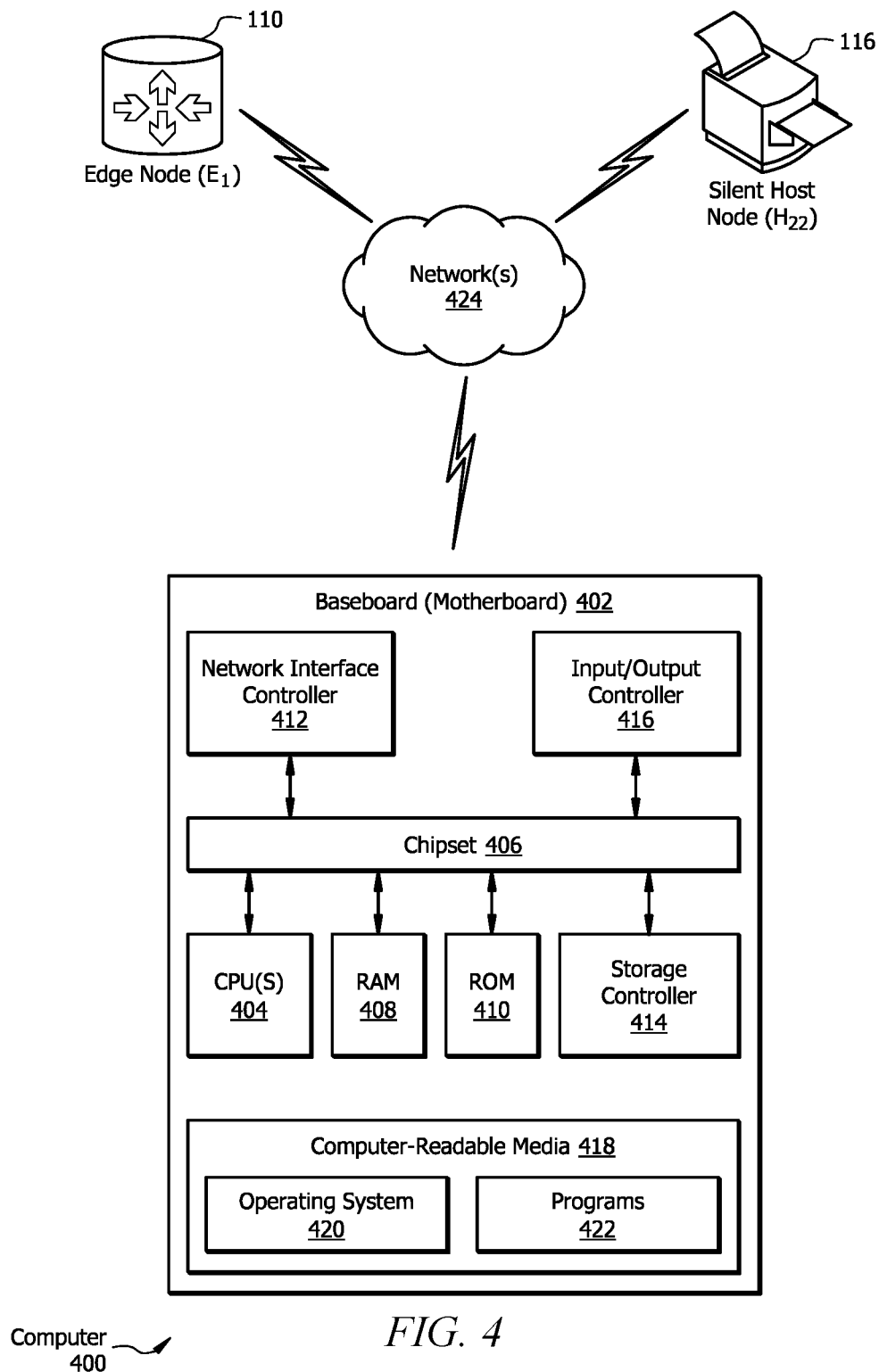
FIG. 4 is a computer architecture diagram showing an example computer architecture for a device capable of executing program components that can be utilized to implement aspects of the various technologies presented herein.

FIG. 4 shows an example computer architecture for a device capable of executing program components for implementing the functionality described above. The computer architecture shown in FIG. 4 illustrates any type of computer 400, such as a conventional server computer, workstation, desktop computer, laptop, tablet, network appliance, e-reader, smartphone, or other computing device, and can be utilized to execute any of the software components presented herein. The computer 400 may, in some examples, correspond to a one or more devices described herein such as the edge nodes 110/112/113, host nodes 108, silent host nodes 116/117, MSMR server 118, and/or any other device described herein, and may comprise personal devices (e.g., smartphones, tables, wearable devices, laptop devices, etc.) networked devices such as servers, switches, routers, hubs, bridges, gateways, modems, repeaters, access points, and/or any other type of computing device that may be running any type of software and/or virtualization technology. The computer 400 includes a baseboard 402, or "motherboard," which is a printed circuit board to which a multitude of components or devices can be connected by way of a system bus or other electrical communication paths. In one illustrative configuration, one or more central processing units ("CPUs") 404 operate in conjunction with a chipset 406. The CPUs 404 can be standard programmable processors that perform arithmetic and logical operations necessary for the operation of the computer 400.

The CPUs 404 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 406 provides an interface between the CPUs 404 and the remainder of the components and devices on the baseboard 402. The chipset 406 can provide an interface to a RAM 408, used as the main memory in the computer 400.

The chipset 406 can further provide an interface to a computer-readable storage medium such as a read-only memory ("ROM") 410 or non-volatile RAM ("NVRAM") for storing basic routines that help to startup the computer 400 and to transfer information between the various components and devices. The ROM 410 or NVRAM can also store other software components necessary for the operation of the computer 400 in accordance with the configurations described herein.

The computer 400 can operate in a networked environment using logical connections to remote computing devices and computer systems through a network, such as the network 424. The chipset 406 can include functionality for providing network connectivity through a NIC 412, such as a gigabit Ethernet adapter. The NIC 412 is capable of connecting the computer 400 to other computing devices over the network 424. It should be appreciated that multiple NICs 412 can be present in the computer 400, connecting the computer to other types of networks and remote computer systems.

The computer 400 can be connected to a storage device 418 that provides nonvolatile storage for the computer. The storage device 418 can store an operating system 420, programs 422, and data, which have been described in greater detail herein. The storage device 418 can be connected to the computer 400 through a storage controller 414 connected to the chipset 406. The storage device 418 can consist of one or more physical storage units. The storage controller 414 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 400 can store data on the storage device 418 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 418 is characterized as primary or secondary storage, and the like.

For example, the computer 400 can store information to the storage device 418 by issuing instructions through the storage controller 414 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 400 can further read information from the storage device 418 by detecting the physical states or characteristics of one or more particular locations within the physical storage units.

In addition to the mass storage device 418 described above, the computer 400 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 400. In some examples, the operations performed by the edge node 110, edge node 112, host nodes 108, silent host node 116, MSMR server 118, and/or any other device described herein, may be supported by one or more devices similar to computer 400. Stated otherwise, some or all of the operations performed by the edge node 110, edge node 112, host nodes 108, silent host node 116, MSMR server 118, and/or any other device described herein, may be performed by one or more computer devices 400.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 418 can store an operating system 420 utilized to control the operation of the computer 400. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 418 can store other system or application programs and data utilized by the computer 400.

In one embodiment, the storage device 418 or other computer-readable storage media is encoded with computer-executable instructions which, when loaded into the computer 400, transform the computer from a general-purpose computing system into a special-purpose computer capable of implementing the embodiments described herein. These computer-executable instructions transform the computer 400 by specifying how the CPUs 404 transition between states, as described above. According to one embodiment, the computer 400 has access to computer-readable storage media storing computer-executable instructions which, when executed by the computer 400, perform the various processes described above with regard to FIGS. 1A-1D, 2, and 3. The computer 400 can also include computer-readable storage media having instructions stored thereupon for performing any of the other computer-implemented operations described herein.

The computer 400 can also include one or more input/output controllers 416 for receiving and processing input from a number of input devices, such as a keyboard, a mouse, a touchpad, a touch screen, an electronic stylus, or other type of input device. Similarly, an input/output controller 416 can provide output to a display, such as a computer monitor, a flat-panel display, a digital projector, a printer, or other type of output device.

As described herein, the computer 400 may comprise one or more of an edge node 110/112/113, host nodes 108, silent host nodes 116/117, MSMR server 118, and/or any other device described herein. The computer 400 may include one or more hardware processors 404 (processors) configured to execute one or more stored instructions. The processor(s) 404 may comprise one or more cores. Further, the computer 400 may include one or more network interfaces configured to provide communications between the computer 400 and other devices, such as the communications described herein as being performed by the edge nodes 110/112/113, host nodes 108, silent host nodes 116/117, MSMR server 118, and/or any other device described herein. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth. The programs 422 may comprise any type of programs or processes to perform the techniques described in this disclosure.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein. Certain embodiments are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The invention claimed is:

1. A method comprising:
receiving, at a first edge node from a first silent host node, an Internet Protocol (IP) multicast address of the first silent host node;
receiving, at a second edge node from a second silent host node, an IP multicast address of the second silent host node, wherein the IP multicast address of the first silent host node is equal to the IP multicast address of the second silent host node;
storing the IP multicast address of the first silent host node and the second silent host node in an entry of a host table, wherein the entry of the host table comprises a layer-3 multicast address associated with the IP multicast address of the first silent host node and the second silent host node;
storing the IP multicast address of the first silent host node and the second silent host node in a multicast routing table;
receiving, at a third edge node, a packet from a third host node;
determining that a destination address of the packet corresponds to the IP multicast address of the first silent host node and the second silent host node; and
sending the packet to the first silent host node and the second silent host node.

2. The method of claim 1, wherein the IP multicast address of the first silent host node and the second silent host node is a Solicited-Node multicast address (SNMA).

3. The method of claim 1, wherein:
the IP multicast address of the first silent host node is sent by the first silent host node to the first edge node in response to the first edge node sending a Multicast Listener Discovery (MLD) query message to the first silent host node; and
the IP multicast address of the second silent host node is sent by the second silent host node to the second edge node in response to the second edge node sending a MLD query message to the second silent host node.

4. The method of claim 1, wherein the multicast routing table comprises a list of listeners associated with the IP multicast address of the first silent host node and the second silent host node, the list of listeners comprising the first silent host node and the second silent host node.

5. The method of claim 1, wherein determining that the destination address of the packet corresponds to the IP multicast address of the first silent host node and the second silent host node comprises determining whether three least-significant bytes of the destination address match three least-significant bytes of the IP multicast address.

6. The method of claim 1, wherein:
the multicast routing table is stored at a mapping system associated with the first edge node, the second edge node, and the third edge node; and
the mapping system includes at least one of a Locator/ID Separation Protocol (LISP) Map-Server/Map Resolver (MSMR) server or an ethernet Virtual Private Network (eVPN) control-plane server.

7. An edge node in a network fabric, the edge node comprising:
one or more processors; and
one or more non-transitory computer-readable media storing computer-executable instructions that, when executed by the one or more processors, cause the one or more processors to perform operations comprising:
receiving a packet from a first host node;
accessing a multicast routing table;
determining that a destination address of the packet corresponds to an Internet Protocol (IP) multicast address associated with a second silent host node and a third silent host node in the multicast routing table; and
sending the packet to the second silent host node and the third silent host node;
wherein the IP multicast address of the second silent host node and the third silent host node are stored in an entry of a host table, the entry of the host table comprising a layer-3 multicast address associated with the IP multicast address of the second silent host node and the third silent host node.

8. The edge node of claim 7, wherein the IP multicast address of the second silent host node and the third silent host node is a Solicited-Node multicast address (SNMA).

9. The edge node of claim 7, wherein the multicast routing table comprises a list of listeners associated with the IP multicast address of the second silent host node and the third silent host node, the list of listeners comprising the second silent host node and the third silent host node.

10. The edge node of claim 7, wherein determining that the destination address of the packet corresponds to the IP multicast address of the second silent host node and the third silent host node comprises determining whether three least-significant bytes of the destination address match three least-significant bytes of the IP multicast address.

11. The edge node of claim 7, wherein the multicast routing table is stored at a mapping system associated with the edge node.

12. The edge node of claim 11, wherein the mapping system includes at least one of a Locator/ID Separation Protocol (LISP) Map-Server/Map Resolver (MSMR) server or an ethernet Virtual Private Network (eVPN) control-plane server.

13. One or more non-transitory computer-readable media storing computer-executable instructions that, when executed by one or more processors, cause the one or more processors to perform operations comprising:
receiving, at a first edge node from a first silent host node, an Internet Protocol (IP) multicast address of the first silent host node;
receiving, at a second edge node from a second silent host node, an IP multicast address of the second silent host node, wherein the IP multicast address of the first silent host node is equal to the IP multicast address of the second silent host node;
storing the IP multicast address of the first silent host node and the second silent host node in an entry of a host table, wherein the entry of the host table comprises a layer-3 multicast address associated with the IP multicast address of the first silent host node and the second silent host node;
storing the IP multicast address of the first silent host node and the second silent host node in a multicast routing table;
receiving, at a third edge node, a packet from a third host node;
determining that a destination address of the packet corresponds to the IP multicast address of the first silent host node and the second silent host node; and
sending the packet to the first silent host node and the second silent host node.

14. The one or more non-transitory computer-readable media of claim 13, wherein the IP multicast address of the first silent host node and the second silent host node is a Solicited-Node multicast address (SNMA).

15. The one or more non-transitory computer-readable media of claim 13, wherein:
the IP multicast address of the first silent host node is sent by the first silent host node to the first edge node in response to the first edge node sending a Multicast Listener Discovery (MLD) query message to the first silent host node; and
the IP multicast address of the second silent host node is sent by the second silent host node to the second edge node in response to the second edge node sending a MLD query message to the second silent host node.

16. The one or more non-transitory computer-readable media of claim 13, wherein the multicast routing table comprises a list of listeners associated with the IP multicast address of the first silent host node and the second silent host node, the list of listeners comprising the first host silent node and the second silent host node.

17. The one or more non-transitory computer-readable media of claim 13, wherein determining that the destination address of the packet corresponds to the IP multicast address of the first silent host node and the second silent host node comprises determining whether three least-significant bytes of the destination address match three least-significant bytes of the IP multicast address.

18. The one or more non-transitory computer-readable media of claim 13, wherein:
the multicast routing table is stored at a mapping system associated with the first edge node, the second edge node, and the third edge node; and
the mapping system includes at least one of a Locator/ID Separation Protocol (LISP) Map-Server/Map Resolver (MSMR) server or an ethernet Virtual Private Network (eVPN) control-plane server.

* * * * *